United States Patent [19]

Murphy et al.

[11] Patent Number: 4,673,615

[45] Date of Patent: Jun. 16, 1987

[54] STIFF FRAY RESISTANT MAT MATERIAL

[75] Inventors: Richard Murphy; John Capron, both of Haverhill, Mass.

[73] Assignee: Foss Manufacturing Co., Inc., Haverhill, Mass.

[21] Appl. No.: 817,128

[22] Filed: Jan. 8, 1986

[51] Int. Cl.⁴ .................. B32B 27/08; B32B 27/12; B32B 31/06; B32B 31/20

[52] U.S. Cl. .................. 428/286; 156/244.22; 156/244.27; 428/287; 428/288; 428/340

[58] Field of Search .................. 428/286, 287, 340; 156/244.22, 244.27

[56] References Cited

U.S. PATENT DOCUMENTS 4,298,649 11/1981 Meitner ........................ 428/288
4,414,266 11/1983 Archer ........................ 428/287
4,418,123 11/1983 Bunnelle et al. ............... 156/244.27
4,595,629 6/1986 Mays ........................... 428/287

Primary Examiner—James C. Cannon
Attorney, Agent, or Firm—Jerry Cohen

[57] ABSTRACT

A stiff abrasion resistant laminated material and process of manufacture thereof. The mat material comprises an extruded sheet of a stiff water resistant thermoplastic polymer, a first layer of a needled non-woven thermoplastic fabric laminated during extrusion to one side of the core sheet, a second layer of a needled non-woven thermoplastic fabric laminated during extrusion to the other side of the sheet wherein the fabric layers are bonded to the sheet solely through interlocking of fiber portions of the fabric materials with the matrix of the sheet.

8 Claims, 2 Drawing Figures

STIFF FRAY RESISTANT MAT MATERIAL

BACKGROUND OF THE INVENTION

The present invention relates to laminated mat, carpet, and fabric materials and specifically to carpets, mats or fabrics which are resistant to fraying.

Prior efforts at constructing carpets, mats, and fabrics which are resistant to strenuous and/or repeated foot traffic or other abrasion typically involve complex weaving of fabric components, application of binders, interweaving of the fabric with webs or matrices and the like.

It is an object of the invention to provide a carpet/mat/fabric material which is resistant to abrasion, fraying and/or loosening of fibers, does not require the implementation of complex or expensive fabric weaving procedures, and does not include extraneous binders, carrier webs, matrices, or the like.

SUMMARY OF THE INVENTION

In accordance with the invention there is provided a stiff abrasion resistant laminated mat/carpet/fabric material comprising: an extruded sheet of a stiff water resistant thermoplastic polymer selected from the group consisting of ethylene, propylene, vinyl, polyester and polyamide based polymers and copolymers, the extruded sheet having a thickness of less than about 100 mils; a first layer of a needled non-woven thermoplastic fabric material laminated to one side of the sheet during extrusion; and, a second layer of a needled non-woven thereoplastic fabric material simultaneously laminated to the other side of the sheet during extrusion; wherein the first and second layers are bonded to the sheet solely through interlocking of fiber portions of the fabric materials with the matrix of the extruded sheet.

Most preferably the first and second fabric materials comprise non-woven fabrics needle punched less than about 2,000 punches per square inch and have a density after needle punching of at least about 3 ounces per square yard.

The fabric materials are typically comprised of a thermoplastic polymer selected from the group consisting of ethylene, propylene, vinyl, polyester and polyamide based polymers and copolymers. Most preferably the fibers of the fabric materials which interlock with the matrix of the extruded wheet are integrally meshed with the sheet matrix, the sheet and the first and second fabric materials comprising the same selected thermoplastic polymer material. Where the sheet and the fabrics comprise the same polymer, the common polymer is preferably selected from the group of polypropylene, polyester, polyamides and copolyamides typically comprising a nylon such as nylon 6, nylon 7, etc., copolyamides of two or more of all of the foregoing polyamides and blends of two or more of all of the foregoing polyamides and/or copolyamides.

The mat materials of the invention are preferably constructed by extruding the sheet and laminating the fabric materials to the sheet as it is extruded. Most preferably the fabric layers are laminated to the extruded sheet between and in the nip if a pair of heated calendar rolls. Each calendar rool is typically maintained at temperature substantially below the melting point of the fabric material which comes into contact with a particular calendar (typically more than about 15° C. below the melting point of the fabric). The nip pressure of the calendar rolls is preferably maintained at least about 75 pounds per square inch during the lamination of the fabrics to the sheet.

BRIEF DESCRIPTION OF THE DRAWINGS

Other objects, features, and advantages will be apparent from the following detailed description of preferred embodiments taken in conjunction with the accompanying drawings in which.

DETAILED DESCRIPTION OF PREFERRED EMBODIMENTS

Figure 1:
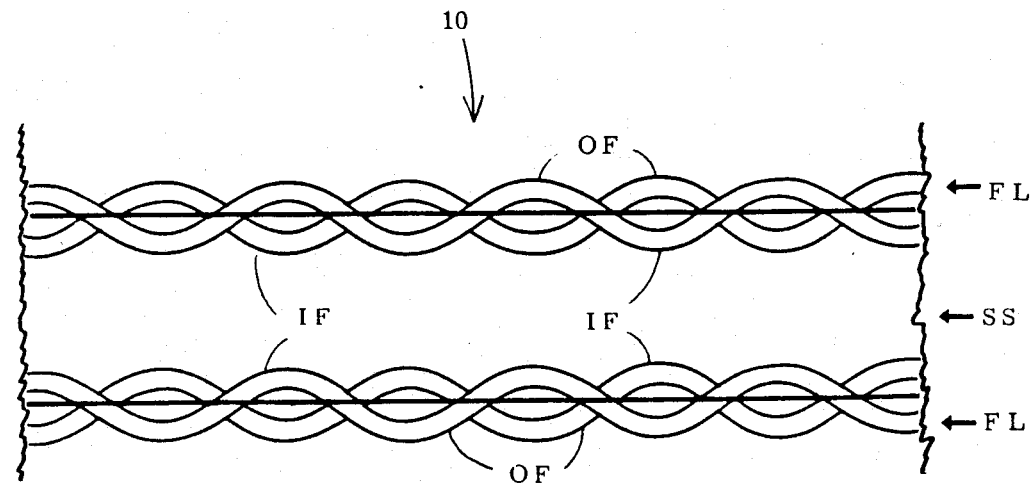
FIG. 1 is a schematic side cross-sectional view of a doubly laminated sheet product according to the invention showing the bonding of the fabric to the core sheet solely via interlocking of fiber portions with the matrix of the core extruded sheet; and, FIG. 2 is a schematic side cross-sectional view of a doubly laminated sheet product according to the invention showing the fibers interlocked with the sheet via meshing of fiber portions with the matrix of the core sheet.

With reference to FIG. 1 there is shown a doubly laminated mat/carpet product 10 comprising a stiff core sheet SS to which two layers of selected fabric materials FL have been laminated on either side of the core sheet SS.

The core sheet is typically constructed by extruding a pre-pelletized thermoplastic feed material selected for its water resistance and stiffness properties. The core feed material is preferably selected from the group of ethylene, propylene, vinyl, polyester and polyamide based polymers and copolymers. Most preferably the core polymer or copolymer material comprises a Surlyn or a polyamide or copolyamide such as nylon as commonly available from various manufacturers such as E. I. dupont De Nemours, a low density (0.910 to 0.940 g/ml) or high density (greater than 0.940 g/ml) polyethylene, a polyester, polypropylene, ethylene vinyl acetate, (list other possible core materials). The core sheet SS is preferably extruded to a thickness of between about 10 mils and about 60 mils to impart a mat-like stiffness to the end product 10, 20, FIGS. 1-2.

Figure 2:
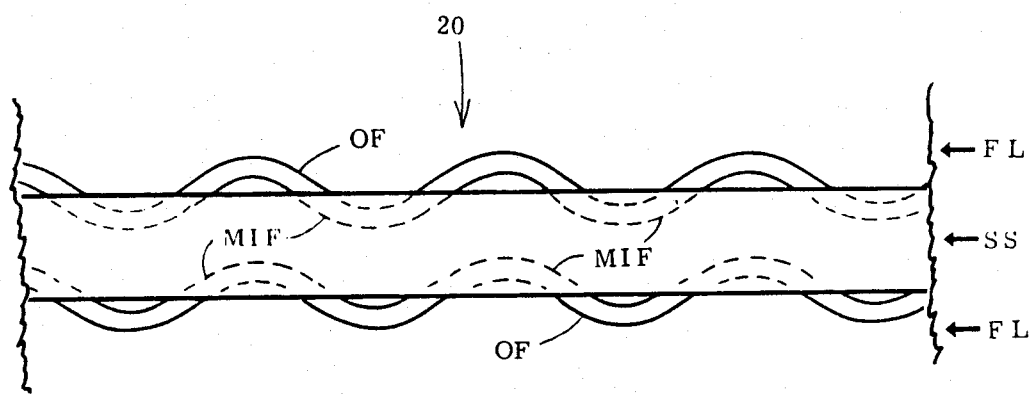

The fabric layers FL are typically constructed from a base stock of non-woven theremoplastic fibers which are typically needle-punched about 500-1000 punches per square inch to a density of at least about 3 ounces per square yard. Two such needle-punched fabric layers FL, FIGS. 1-2, are then simultaneously fed in sheet form into the nip of a pair of calendar rolls together with the freshly extruded core layer SS between the sheets of fabric FL. The nip pressure between the calendar is maintained at less than about 75 pounds per square inch thereby mechanically forcing the two fabric layers FL into pressure contact with either side of the extruded core sheet. The calendar rolls are also maintained at an elevated temperature to assist in the lamination procedure, each calendar roll being preferably maintained at a temperature of at least about 15° C. below the melting point of the fabric material with which a particular calendar roll comes into direct mechanical contact.

With reference to FIG. 1 the thermoplastic material out of which the fabric layers are typically comprised are ethylene, propylene, vinyl, polyester, and polyamide (nylons) based polymers and copolymers generally, and preferably, polypropylene, polyesters, polyamides and copolyamides.

As used herein the terms polyamides and copolyamides refer to nylons, i.e., polymers and copolymers formed from aliphatic dicarboxylic acids such as adipic acid or sebacic acid and aliphatic diamines.

The resultant product of the process of laminating two fabric materials FL to a freshly extruded core sheet SS is shown in FIG. 1. Because the core sheet SS is in a somewhat tacky, i.e., semi-soft, state as it emerges from the extruder, certain portions of the individual fibers IF of the fabric sheets will penetrate the matrix of the core sheet SS. As the semi-molten core sheet cools, the fiber portions IF remain imbedded in the matrix and upon eventual cooling of the sheet SS to room temperature, fiber portions IF are permanently imbedded, i.e., interlocked, within the hardened and stiffened matrix of the core sheet SS. The needled fabric layers FL are thereby bound within the stiff core sheet solely through such interlocking of fiber portions IF and an outer layer of fibers OF is thereby held on the outside of either surface of the stiff core sheet.

Although the outer fabric portions OF of the fabric layers FL of the FIG. 1 mat material 10 are relatively firmly bound by such interlocking, if the core sheet SS comprises a thermoplastic polymer which is alloy incompatible with the polymer material comprising the fabric materials (such as Surlyn and polypropylene, Surlyn and nylon, polyester and polypropylene, nylon and polypropylene, and the like), the outer fabric portions OF, may over long periods of subjection to abrasion, become loosened from the surface of sheet SS by virtue of the chemical incompatibility of the fabric material with the core sheet material.

In a most preferred embodiment of the invention the core sheet SS, FIG. 2, is selected to comprise the same or essentially the same polymer as the fabric layers FL are comprised of. For example, if the core sheet SS thermoplastic material is selected to comprise a polypropylene and the fabric layer FL material is also selected to comprise polypropylene, the imbedded fiber portions MIF which become interlocked with the matrix of the core sheet SS, will under the preferred lamination conditions become chemically meshed with the matrix of the core by virtue of the chemical compatibility of the fabric and sheet materials. Such mesh-interlocking serves to drastically reduce and/or eliminate the loosening of outer fibers OF, FIG. 2, even over long periods of subjection of the product 20 to abrasion.

Most preferably, where mesh-interlocking of fiber portions MIF with the matrix of core sheet SS, FIG. 2, is desired, the thermoplastic, material of both of the fabric layers FL and core sheet matrix SS are selected to comprise one of a polypropylene, a polyester, a polyamide, a copolyamide, or blends of two or more of all of the foregoing.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A stiff abrasion resistant laminated mat material comprising:
    an extruded sheet of a stiff water resistant thermoplastic polymer material selected from the group consisting of ethlene, propylene, vinyl, polyester, and polyamide based polymers and copolymers, the extruded sheet having a thickness of less than about 100 mils;
    a first layer of a needled non-woven thermoplastic fabric material laminated to one side of the sheet during extrusion of the sheet; and,
    a second layer of a needled non-woven thermoplastic fabric material laminated to the other side of the sheet during extrusion of the sheet;
    the first and second layers being bonded to the sheet solely through interlocking of fiber portions of the fabric materials with the matrix of the sheet.

2. The mat material of claim 1 wherein the first and second fabric materials are needle punched less than about 2,000 punches per square inch.

3. The mat material of claim 2 wherein the first and second fabric materials have a density of at least about 3 ounces per square yard.

4. The mat material of claim 3 wherein the first and second fabric materials comprise a theremoplastic polymer selected from the group consisting of ethylene, propylene, vinyl, polyester and polyamide based polymers and co-polymers.

5. The mat material of claim 4 wherein the interlocked fibers are meshed with the matrix of the sheet, the sheet and the first and second fabric materials comprising a single selected thermoplastic material.

6. The mat material of claim 5 wherein the thermoplastic material selected to comprise the sheet and the first and second fabric materials is selected from the group consisting of polypropylene, polyester, polyamides and copolyamides.

7. The mat material of claims 1, 5 and 6 as made by application of heat and pressure between the sheet and the fabric materials, the fabric materials laminated to either side of the sheet during extrusion between a pair of calnedar rolls.

8. The mat material of claims 1, 5 and 6 as made by laminating the fabric mateials to either side of the sheet between a pair of calendar rolls having a nip pressure of at least about 75 pounds per square inch, each calendar roll maintained at a temperature substantially below the melting point of the fabric material with which each such calendar roll comes in direct contact during lamination.

* * * * *